United States Patent
Hayashi et al.

(10) Patent No.: US 8,810,737 B1
(45) Date of Patent: Aug. 19, 2014

(54) VIDEO DISPLAY DEVICE AND EXTERNAL DEVICE

(75) Inventors: Takafumi Hayashi, Moriguchi (JP);
Tsuyoshi Hasegawa, Moriguchi (JP);
Masafumi Nishi, Moriguchi (JP)

(73) Assignee: SANYO Electric Co., Ltd.,
Moriguchi-shi (JP)

( * ) Notice: Subject to any disclaimer, the term of this patent is extended or adjusted under 35 U.S.C. 154(b) by 0 days.

(21) Appl. No.: 14/345,884

(22) PCT Filed: Dec. 28, 2011

(86) PCT No.: PCT/JP2011/080395
§ 371 (c)(1),
(2), (4) Date: Mar. 19, 2014

(87) PCT Pub. No.: WO2013/098991
PCT Pub. Date: Jul. 4, 2013

(51) Int. Cl.
*H04N 5/44* (2011.01)
*G06F 13/30* (2006.01)

(52) U.S. Cl.
CPC ................... *H04N 5/4403* (2013.01);
*H04N 2005/4408* (2013.01)
USPC ...................... 348/734; 340/12.26; 340/12.29

(58) Field of Classification Search
USPC ................ 348/734, 706, 552, 569;
340/12.22–12.26, 12.28, 12.29, 12.52,
340/12.53, 13.27, 13.29, 13.3, 13.33, 13.35,
340/13.36; 710/5, 8, 10, 11, 14;
725/151–153; 345/158; 341/176
See application file for complete search history.

(56) References Cited

U.S. PATENT DOCUMENTS

| | | | | |
|---|---|---|---|---|
| 4,751,581 A | * | 6/1988 | Ishiguro et al. | 348/734 |
| 5,341,166 A | * | 8/1994 | Garr et al. | 725/153 |
| 5,959,539 A | * | 9/1999 | Adolph et al. | 340/3.5 |
| 6,127,941 A | * | 10/2000 | Van Ryzin | 340/4.37 |
| 6,400,280 B1 | * | 6/2002 | Osakabe | 340/4.41 |
| 6,747,590 B1 | * | 6/2004 | Weber | 341/176 |
| 6,784,805 B2 | * | 8/2004 | Harris et al. | 340/12.22 |
| 6,967,588 B2 | * | 11/2005 | Zustak et al. | 340/12.26 |
| 6,985,069 B2 | * | 1/2006 | Marmaropoulos | 340/12.26 |
| 8,154,381 B2 | * | 4/2012 | Kohanek | 340/3.71 |
| 8,390,746 B2 | * | 3/2013 | Tsurumoto et al. | 348/734 |
| 2002/0047944 A1 | | 4/2002 | Sato | |
| 2002/0089427 A1 | * | 7/2002 | Aratani et al. | 340/825.72 |

(Continued)

FOREIGN PATENT DOCUMENTS

EP  1 944 969 A2  7/2008
JP  6-311385 A  11/1994

(Continued)

OTHER PUBLICATIONS

International Search Report dated Feb. 28, 2012 issued in corresponding application No. PCT/JP2011/080395.

*Primary Examiner* — Victor Kostak
(74) *Attorney, Agent, or Firm* — Westerman, Hattori, Daniels & Adrian, LLP

(57) ABSTRACT

To a video display device, a remote control transmitter for remotely operating the video display device is attached. When at least one of predetermined keys provided in the remote control transmitter of an external device is operated, the video display device switches, according to the setting of an "input target", the validness and the invalidness of an remote operation on the at least one of predetermined keys of the external device which outputs a video stream to the video display device.

5 Claims, 9 Drawing Sheets

(56) References Cited

U.S. PATENT DOCUMENTS

| | | |
|---|---|---|
| 2003/0142952 A1* | 7/2003 | Oka et al. ............... 386/46 |
| 2003/0177489 A1* | 9/2003 | Watanabe et al. ......... 725/25 |
| 2005/0088278 A1* | 4/2005 | Harada ................. 340/3.71 |
| 2005/0122438 A1 | 6/2005 | Sato |
| 2006/0267726 A1 | 11/2006 | Arai et al. |
| 2007/0165997 A1* | 7/2007 | Suzuki et al. ............ 386/46 |
| 2009/0213278 A1* | 8/2009 | Tsurumoto et al. ....... 348/734 |
| 2010/0052870 A1* | 3/2010 | King ................. 340/286.02 |
| 2010/0328133 A1 | 12/2010 | Nojima et al. |

FOREIGN PATENT DOCUMENTS

| | | |
|---|---|---|
| JP | 2001-309459 A | 11/2001 |
| JP | 2003-87881 A | 3/2003 |
| JP | 2004-187143 A | 7/2004 |
| JP | 2005-198036 A | 7/2005 |
| JP | 2006-319838 A | 11/2006 |
| JP | 2007-13929 A | 1/2007 |
| JP | 2008-48137 A | 2/2008 |
| JP | 2009-182896 A | 8/2009 |
| JP | 2010-283749 A | 12/2010 |
| JP | 2011-188453 A | 9/2011 |

* cited by examiner

VIDEO DISPLAY DEVICE AND EXTERNAL DEVICE

TECHNICAL FIELD

The present invention relates to a video display device that includes an external input terminal through which a video stream is input externally and that is remotely operated by a remote control transmitter and an external device that supplies a video stream to a video display device and that is remotely operated by a remote control transmitter.

BACKGROUND ART

The video display device of a television receiver or the like has not only the function of displaying video based on a video stream generated by an internal circuit such as a broadcast tuner but also generally has an external input terminal through which the video stream is input externally and also has the function of displaying the video based on the video stream from the outside. The external input terminal of the video display device and the output terminal of an external device through which the video stream is output are connected, and the "input target" of the video display device is set at an external input, and thus it is possible to display, on the video display device, the video based on the video stream from the external device.

In general, a remote control transmitter for remotely operating the video display device (hereinafter also referred to as a "video display device remote control transmitter") is attached to the video display device, and a remote control transmitter for remotely operating the external device (hereinafter also referred to as an "external device remote control transmitter") is attached to the external device.

RELATED ART DOCUMENT

Patent Document

Patent document 1: JP-A-2003-87881
Patent document 2: JP-A-2004-187143
Patent document 3: JP-A-2005-198036
Patent document 4: JP-A-2006-319838

SUMMARY OF THE INVENTION

Problems to be Solved by the Invention

Some external devices have the function (hereinafter also referred to as a "remote control transmitter additional function") of registering a remote control code transmitted from a remote control transmitter other than the external device remote control transmitter and of allowing a remote operation by the remote control transmitter other than the external device remote control transmitter.

However, when the remote control transmitter additional function is utilized to allow the video display device remote control transmitter to remotely operate the external device, if the key of the video display device remote control transmitter corresponding to the remote control code registered in the external device by the remote control transmitter additional function is operated, both the external device and the video display device are operated at the same time, with the result that not only the operation that is intended by a user but also an operation that is not intended by the user is disadvantageously performed.

Means for Solving the Problem

According to an aspect of the present invention, there is provided a video display device including: an input terminal through which a video stream output by a specific external device is input; a reception portion; and a control portion. The video display device has, choices of an "input target", a plurality of choices including a choice corresponding to the input terminal. The reception portion receives a remote control signal transmitted from a remote control transmitter for remotely operating the video display device, and transmits, to the control portion, a signal including a remote control code based on the remote control signal. When the control portion receives, from the reception portion, any one of the remote control codes corresponding to at least one of predetermined keys provided in the remote control transmitter, if the "input target" is set at the choice corresponding to the input terminal, the control portion controls the specific external device such that a remote operation of the specific external device on the at least one of predetermined keys is made valid, and does not perform an operation of the video display device corresponding to the remote control code received from the reception portion whereas if the "input target" is not set at the choice corresponding to the input terminal, the control portion controls the specific external device such that the remote operation of the specific external device on the at least one of predetermined keys is made invalid, and performs the operation of the video display device corresponding to the remote control code received from the reception portion.

According to another aspect of the present invention, there is provided an external device that outputs a video stream to a video display device, the external device including: a reception portion; and a control portion. The reception portion receives a remote control signal transmitted from a remote control transmitter for remotely operating the video display device, and transmits, to the control portion, a signal including a remote control code based on the remote control signal. When the control portion receives, from the reception portion, any one of the remote control codes corresponding to at least one of predetermined keys provided in the remote control transmitter, if a notification that the "input target" of the video display device is set at a choice which inputs the video stream from the external device is received from the video display device, the control portion controls the video display device such that a remote operation of the video display device on the at least one of predetermined keys is made invalid, and performs an operation of the external device corresponding to the remote control code received from the reception portion whereas if a notification that the "input target" of the video display device is not set at the choice which inputs the video stream from the external device is received from the video display device, the control portion controls the video display device such that the remote operation of the video display device on the at least one of predetermined keys is made valid, and does not perform the operation of the external device corresponding to the remote control code received from the reception portion.

Effects of the Invention

In the present invention, it is possible to remotely operate, only with the video display device remote control transmitter, both the video display device and the external device as intended by the user.

The significance and effects of the present invention will be further clarified by the description of embodiments below. However, each of the following embodiments is simply one embodiment of the present invention; the significance of the terms of the present invention or each constituent requirement is not limited to the embodiments described below.

DESCRIPTION OF EMBODIMENTS

Embodiments of the present invention will be described below with reference to accompanying drawings.

First Embodiment

Figure 1A:
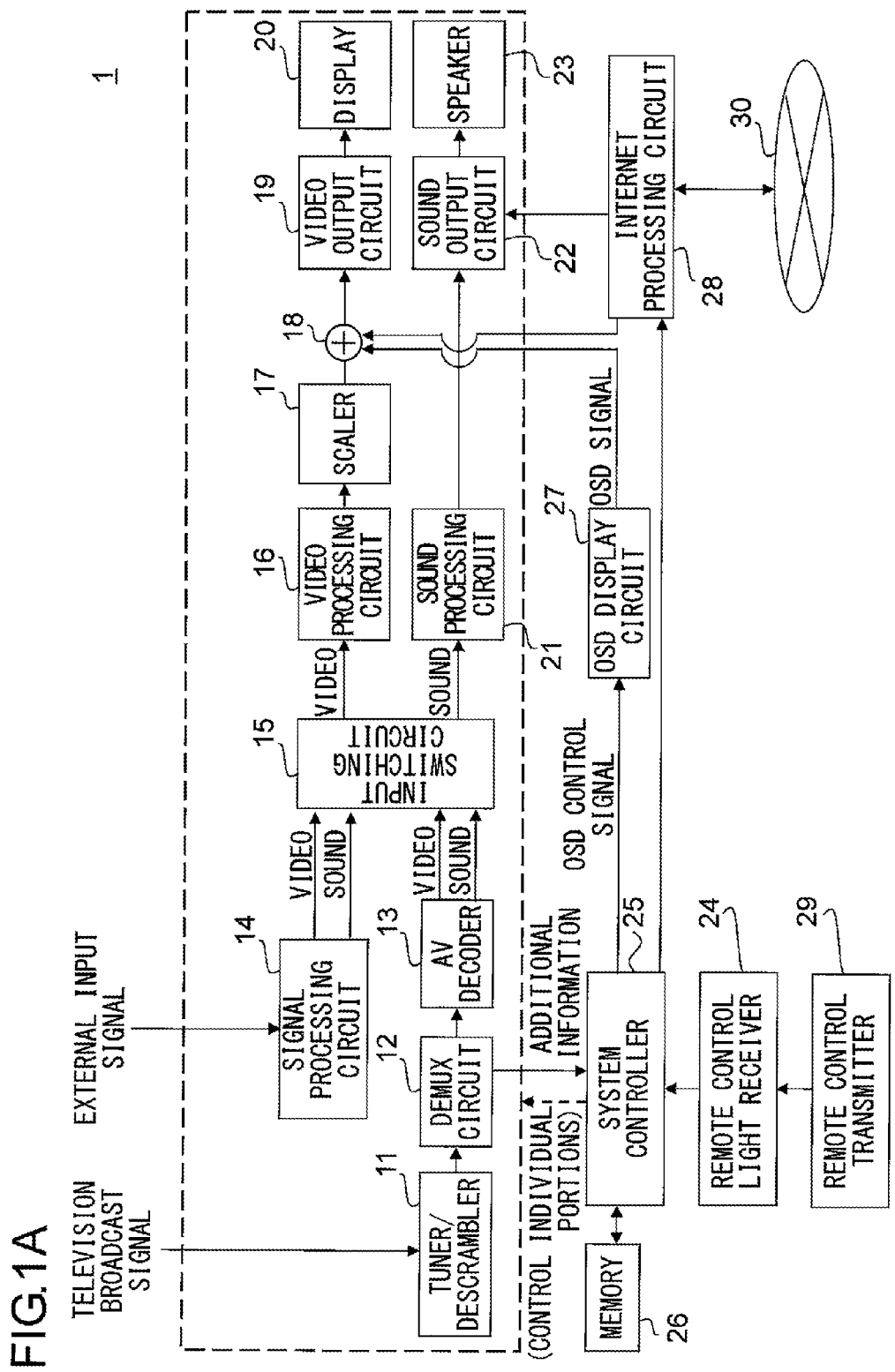
FIG. 1A A block diagram of a video display device.

FIG. 1A is a block diagram of a video display device 1. The video display device 1 is a television receiver having the Internet connection function, and includes, as shown in FIG. 1A, a tuner/descrambler 11, a DEMUX circuit 12, an AV decoder 13, a signal processing circuit 14, an input switching circuit 15, a video processing circuit 16, a scaler 17, a composite circuit 18, a video output circuit 19, a display 20, a sound processing circuit 21, a sound output circuit 22, a speaker 23, a remote control light receiver 24, a system controller 25, a memory 26, an OSD (on-screen display) display circuit 27 and an Internet processing circuit 28. A remote control transmitter (hereinafter also referred to as a "TV remote control transmitter") 29 for remotely operating the video display device 1 is attached to the video display device 1. A user operates the TV remote control transmitter 29, and thereby can operate the video display device 1 remotely.

Figure 1B:
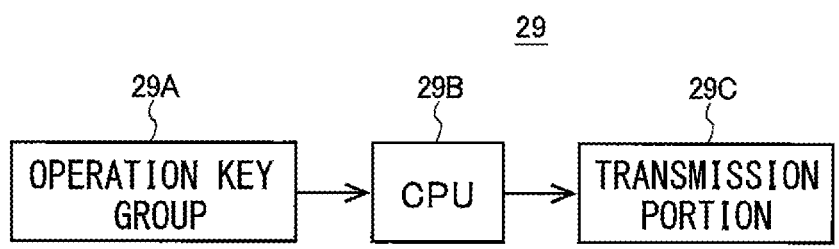
FIG. 1B A block diagram of a remote control transmitter attached to the video display device.

The TV remote control transmitter 29 includes, as shown in FIG. 1B, an operation key group 29A consisting of a plurality of operation keys, a CPU 29B and a transmission portion 29C including an infrared light-emitting element. In the internal memory of the CPU 29B, a data table indicating a correlation between the individual operation keys and individual remote control codes is stored. The operation key group 29A outputs a signal corresponding to a key operation by the user to the CPU 29B, and the CPU 29B references the data table stored in the internal memory to output a remote control code corresponding to the output signal of the operation key group 29A to the transmission portion 29C. The transmission portion 29C outputs an infrared signal modulated based on the remote control code received from the CPU 29B.

Figure 1C:
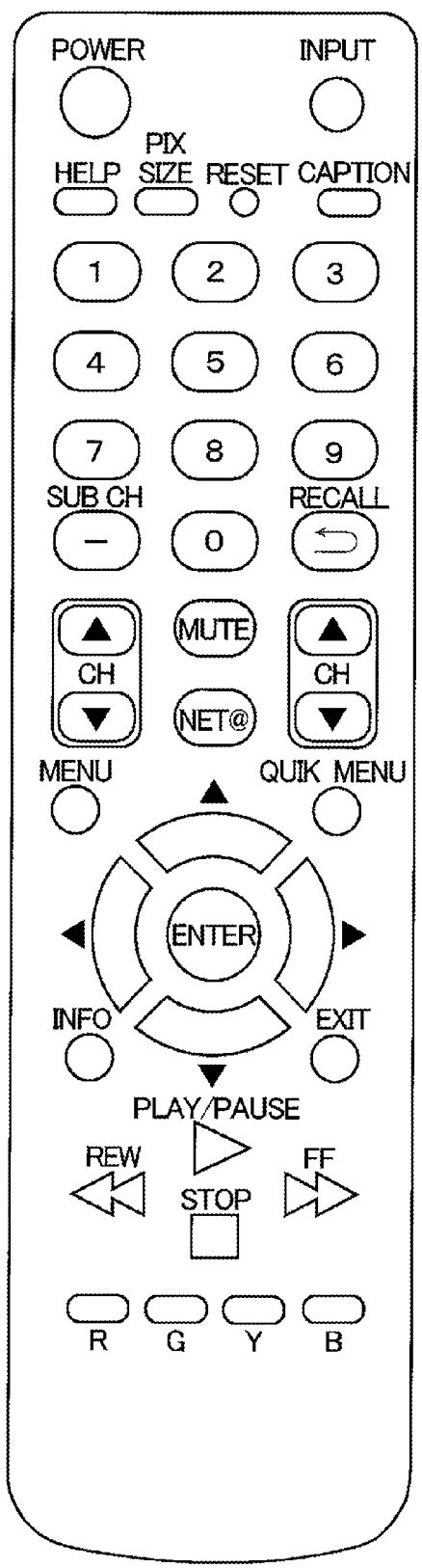
FIG. 1C A front view of the remote control transmitter attached to the video display device.

As shown in FIG. 1C, on the front surface of the TV remote control transmitter 29, a "power supply (POWER)" key, an "input switching (INPUT)" key, a "channel +" key, a "channel −" key, a "menu (MENU)" key, numerical keys ("0" to "9"), a selection key ("up", "down", "right", "left" and "ENTER"), an "Internet (NET@)" key, a "cancellation (RECALL)" key, an "exit (EXIT)" key and the like, which constitute the operation key group 29A, are provided.

The "input switching" key is an operation key for switching the "input target" described above. The "channel +" key is an operation key for switching the reception channel described above in ascending order, and the "channel −" key is an operation key for switching the reception channel in descending order. The "menu" key is an operation key for alternately switching the operation mode of the television broadcast receiver 1 between a normal mode and a menu mode.

In the first embodiment, the video display device 1 is an example of the video display device according to an aspect of the present invention.

The video display device 1 has, as the choices of the "input target", "terrestrial digital broadcast", "satellite digital broadcast", a "HDMI (high definition multimedia interface) 1", a "HDMI2" and a "HDMI3".

The tuner/descrambler 11 performs processing (channel selection processing) for extracting signals corresponding to the "input target" and the "reception channel" that are currently set, on television broadcast signals transmitted through an antenna or the like, and also performs predetermined high-frequency processing, scramble cancellation processing, demodulation processing and the like. The signals obtained by these types of processing are fed out to the DEMUX circuit 12 as a packet. The "input target" and the "reception channel" can be switched by the system controller 25.

The DEMUX circuit 12 decodes the packet received from the tuner/descrambler 11. Here, the packet is classified, by the DEMUX circuit 12, into MPEG data indicating the content of a television program and additional information. Then, the MPEG data consisting of a video stream and a sound stream and the additional information are fed out to the AV decoder 13 and the system controller 25, respectively. The additional information is, for example, guide information on a television program that is currently being broadcast or that will be broadcast in the future or information such as a notice from a broadcaster, and is broadcast together with information on the content of the television program every predetermined time interval.

The AV decoder 13 decodes the MPEG data received from the DEMUX circuit 12 into a video signal and a sound signal, and feeds out the video signal and the sound signal to the input switching circuit 15.

Based on an external input signal (the video stream and the sound stream) corresponding to the "input target" which is currently set, the signal processing circuit 14 acquires the video signal and the sound signal indicating the content. The signal processing circuit 14 feeds out the video signal and the sound signal acquired to the input switching circuit 15.

Among the video signal and the sound signal transmitted from the side of the preceding stage, the input switching circuit 15 transmits only signals corresponding to the "input target" which is currently set, to a circuit on the side of the subsequent stage.

Specifically, when the "terrestrial digital broadcast" or the "satellite digital broadcast" is set at the "input target", the input switching circuit 15 transmits the video signal and the sound signal transmitted from the AV decoder 13 to the video processing circuit 16 and the sound processing circuit 21, respectively. On the other hand, when the "HDMI1", "HDMI2" or the "HDMI3" is set at the "input target", the video signal and the sound signal transmitted from the signal processing circuit 14 are transmitted to the video processing circuit 16 and the sound processing circuit 21, respectively.

The video processing circuit 16 performs various types of processing on the video signal received from the input switching circuit 15, and feeds it out to the scaler 17. The processing performed by the video processing circuit 16 includes various types of processing on image quality adjustment (for example, contract adjustment, brightness adjustment and sharpness adjustment).

The scaler 17 feeds out, according to an instruction from the system controller 25, the video signal received from the video processing circuit 16 without the video signal being processed, to the composite circuit 18. Alternatively, the scaler 17 performs processing (small-screen conversion processing) for displaying the video on a small screen on the video signal received from the video processing circuit 16, and feed it out to the composite circuit 18.

The composite circuit 18 receives the video signal, an OSD signal and a network content video signal from the scaler 17, the OSD display circuit 27 and the Internet processing circuit 28, respectively, and feeds out any one of these signals to the video output circuit 19. Alternatively, the composite circuit 18 generates a display signal indicating content obtained by combining (overlaying) at least two items of display content among these signals, and feeds it out to the video output circuit 19.

The video output circuit 19 feeds out the received display signal to the display 20, and displays the content of the display signal on the display 20. As the display 20, various types of displays such as a CRT (cathode ray tube) and a liquid crystal display can be adopted.

The sound processing circuit 21 performs necessary predetermined processing on the sound signal received from the input switching circuit 15, and feeds it out to the sound output circuit 22. The sound output circuit 22 feeds out the received sound signal to the speaker 23, and outputs sound based on the sound signal through the speaker 23.

The remote control light receiver 24 receives an infrared signal transmitted from the TV remote control transmitter 29, converts it into an electrical signal including the remote control code and transmits it to the system controller 25.

The system controller 25 controls the individual portions of the video display device 1 according to operations by the user on a plurality of types of operation keys (not shown in FIG. 1A) provided in the video display device 1 and on a plurality of types of operation keys provided in the TV remote control transmitter 29. The memory 26 stores the data table indicating the relationship between the operation keys and the remote control codes and information such as various types of OSD display screen data.

The OSD display circuit 27 receives an OSD control signal including an OSD display screen from the system controller 25, generates the OSD signal based on this control signal and feeds it out to the composite circuit 18.

The Internet processing circuit 28 has the function of connecting to the Internet 30, receives the provision of network content via the Internet 30 from a predetermined server, feeds out the video signal of the network content to the composite circuit 18 and feeds out the sound signal of the network content to the sound output circuit 22.

FIGS. 2A, 2B, 2C and 2D are respectively a front view of the video display device 1, a right side view when viewed from the front surface, a left side view when viewed from the front surface and a perspective view. FIGS. 2A, 2B, 2C and 2D show a state where an Apple TV 2 is inserted into a lower portion of the front surface of the video display device 1.

Figure 2A:
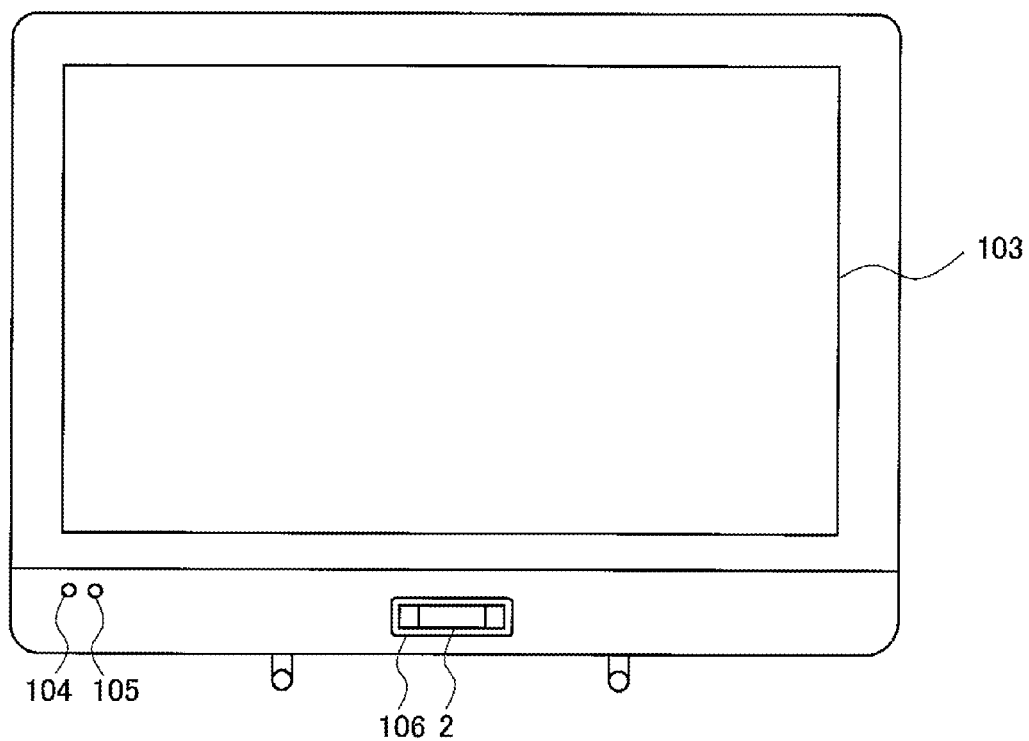
FIG. 2A A front view of the video display device.
Figure 2B:
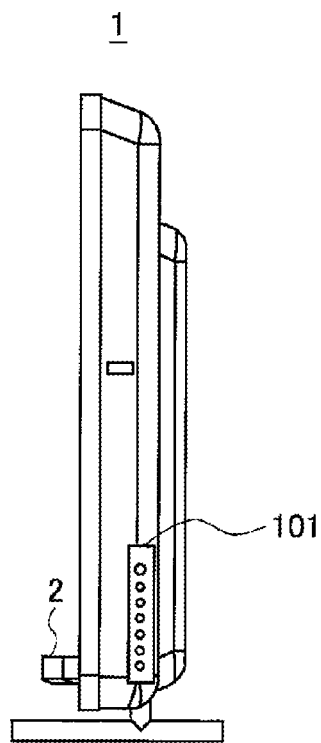
FIG. 2B A right side view of the video display device.

In a lower portion of the right side surface when viewed from the front surface of the video display device 1, as shown in FIG. 2B, an operation portion 101 is provided. The operation portion 101 includes a power supply switch for switching on and off the power supply of the video display device 1.

Figure 2C:
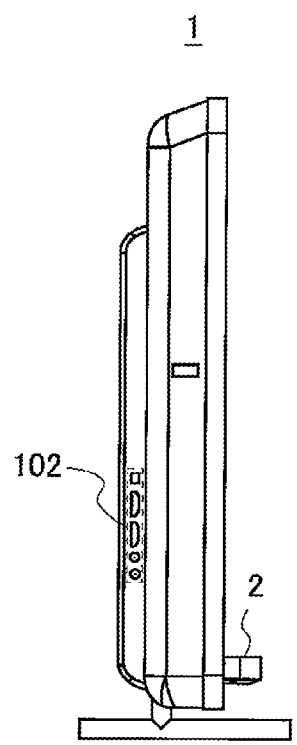
FIG. 2C A left side view of the video display device.

In a back portion of the left side surface when viewed from the front surface of the video display device 1, as shown in FIG. 2C, a terminal portion 102 is provided. The terminal portion 102 includes a HDMI terminal that corresponds to the "HDMI1" which is one of the choices of the "input target", a HDMI terminal that corresponds to the "HDMI2" which is one of the choices of the "input target", an antenna terminal for the connection of the antenna and a LAN (local area network) terminal of the connection of the Internet.

Figure 2D:
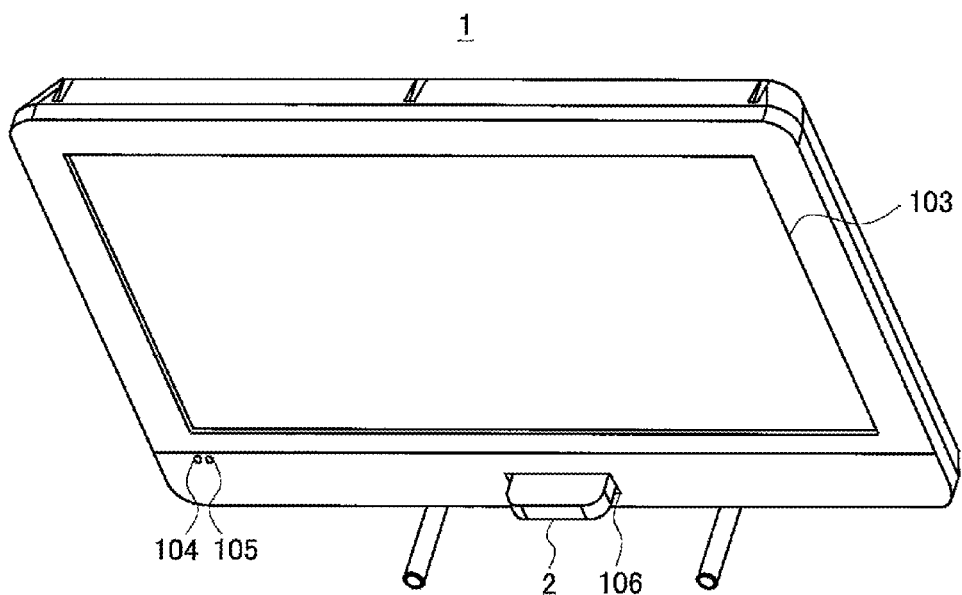
FIG. 2D A perspective view of the video display device.

In the front surface of the video display device 1, as shown in FIGS. 2A and 2D, the display screen 103 of the display 20 (see FIG. 1A), the light reception surface 104 of the remote control light receiver 24 (see FIG. 1A) and a power supply lamp 105 are provided. The power supply lamp 105 is turned green when the power supply of the video display device 1 is turned on; the power supply lamp 105 is turned red when the video display device 1 is placed on standby; the power supply lamp 105 is turned off when the power supply of the video display device 1 is turned off. The turning on of the power supply, the placing of the video display device 1 on standby and the turning off of the power supply can be switched by operating the power supply switch included in the operation portion 101 (see FIG. 2B); the turning on of the power supply and the placing of the video display device 1 on standby can be switched by operating a power supply key included in the TV remote control transmitter 29 (see FIG. 1A).

Figure 3:
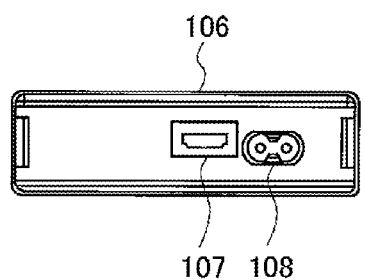
FIG. 3 A diagram showing an insertion portion provided in a lower portion of the front surface of the video display device.

In the lower portion of the front surface of the video display device 1, as shown in FIGS. 2A and 2D, an insertion portion 106 is provided into which the Apple TV 2 can be directly inserted. As shown in FIG. 3, the insertion portion 106 includes a HDMI terminal 107 that corresponds to the "HDMI3" which is one of the choices of the "input target" and an AC power supply terminal 108. The AC power supply terminal 108 is a terminal that outputs a commercial power supply voltage (for example, in Japan, a voltage of AC 100V), which the video display apparatus 1 receives from a commercial power supply outlet via a power supply cord, to outside. Since as described above, the video display device 1 includes the insertion portion 106 into which the Apple TV 2 can be directly inserted, it is possible to easily connect the Apple TV 2.

Figure 4:
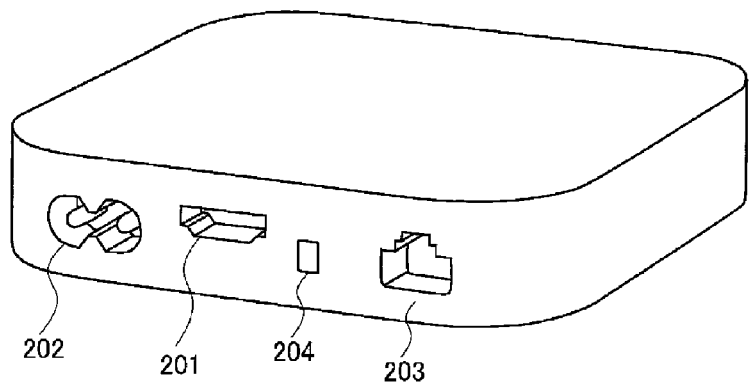
FIG. 4 A perspective view when viewed from the back surface of an Apple TV (registered trademark of Apple Inc.)

The arrangement of the HDMI terminal 107 and the AC power supply terminal 108 is designed such that when the Apple TV 2 is inserted into the insertion portion 106, the HDMI terminal 107 of the insertion portion 106 and a HDMI port 201 (see FIG. 4) provided in the back surface of the Apple TV 2 are connected, and that the AC power supply terminal 108 of the insertion portion 106 and an AC power supply port 202 (see FIG. 4) provided in the back surface of the Apple TV 2 are connected. Hence, when the Apple TV 2 is inserted into the insertion portion 106, the video display device 1 and the Apple TV 2 are HDMI-connected, and furthermore the AC power supply terminal 108 of the insertion portion 106 and the AC power supply port 202 (see FIG. 4) provided in the back surface of the Apple TV 2 are connected, with the result that the AC power supply voltage is fed from the video display device 1 to the Apple TV 2.

Figure 5:
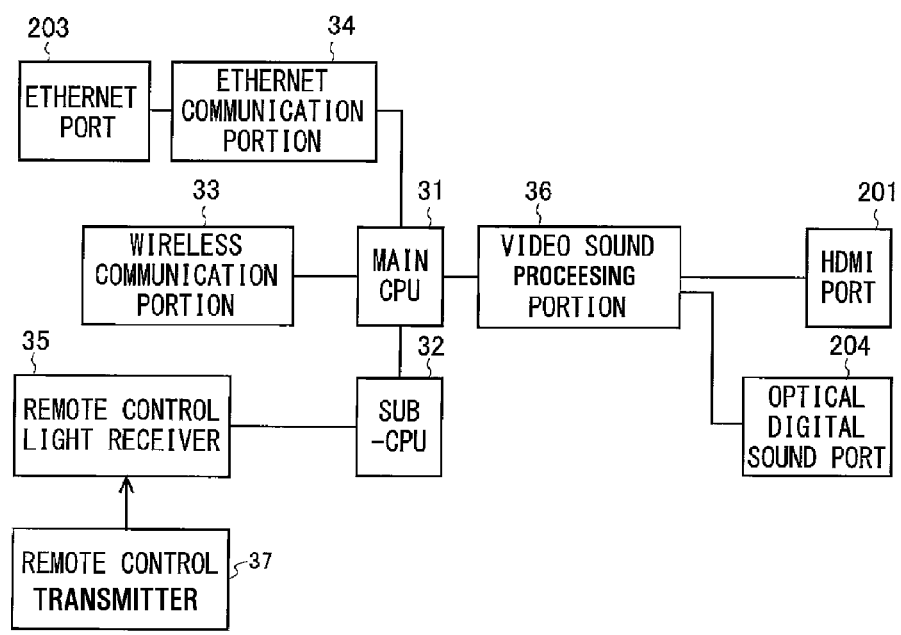
FIG. 5 A block diagram of the Apple TV.

A block diagram of the Apple TV 2 will now be shown in FIG. 5. The Apple TV 2 includes a main CPU 31, a sub-CPU 32, a wireless communication portion 33 that performs wireless communication with a mobile terminal, a tablet terminal, a personal computer, a cloud server or the like through Bluetooth (registered trademark) or Wi-Fi (registered trademark) or the like, an Ethernet communication portion 34 that performs wire communication with a personal computer or the like, an Ethernet port 203, a remote control light receiver 35, a video sound processing circuit 36 that is formed with a HDMI transmission portion and a digital sound interface portion, the HDMI port 201 and an optical digital sound port 204. A remote control transmitter (hereinafter referred to as an "Apple remote") 37 for remotely operating the Apple TV 2 is attached to the Apple TV 2. The user operates the Apple remote 37, and thereby can remotely operate the Apple TV 2.

Figure 6:
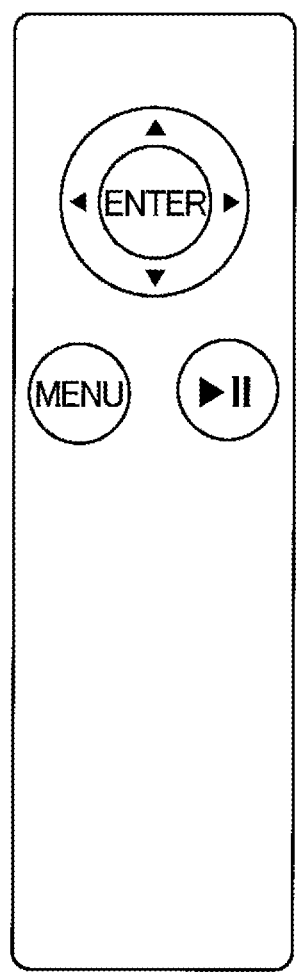
FIG. 6 A front view of a remote control transmitter attached to the Apple TV.

In the Apple remote 37, as shown in FIG. 6, a selection key ("up", "down", "right", "left" and "ENTER"), a "menu (MENU)" key and a "reproduction/temporary stop" key are provided.

The remote control light receiver 35 receives an infrared signal transmitted from the Apple remote 37, converts it into an electrical signal and transmits it to the sub-CPU 32. The sub-CPU 32 controls the operation of the main CPU 31 based on the electrical signal received from the remote control light receiver 35.

The main CPU 31 decodes, according to the control on the sub-CPU 32, a signal that is input through the Ethernet port 203 and that is received by the Ethernet communication portion 34 or a signal that is received by the wireless communication portion 33 into a video stream, a sound stream, still image data or the like, and feeds it out to the video sound processing circuit 36.

The video sound processing circuit 36 outputs, to the HDMI port 201, the video stream, the sound stream, the still image data or the like received from the main CPU 31 in the form of TMDS (transition minimized differential signaling), and converts the sound stream received from the main CPU 31 into an optical digital sound signal to output it to the optical digital sound port 204.

Figure 7:
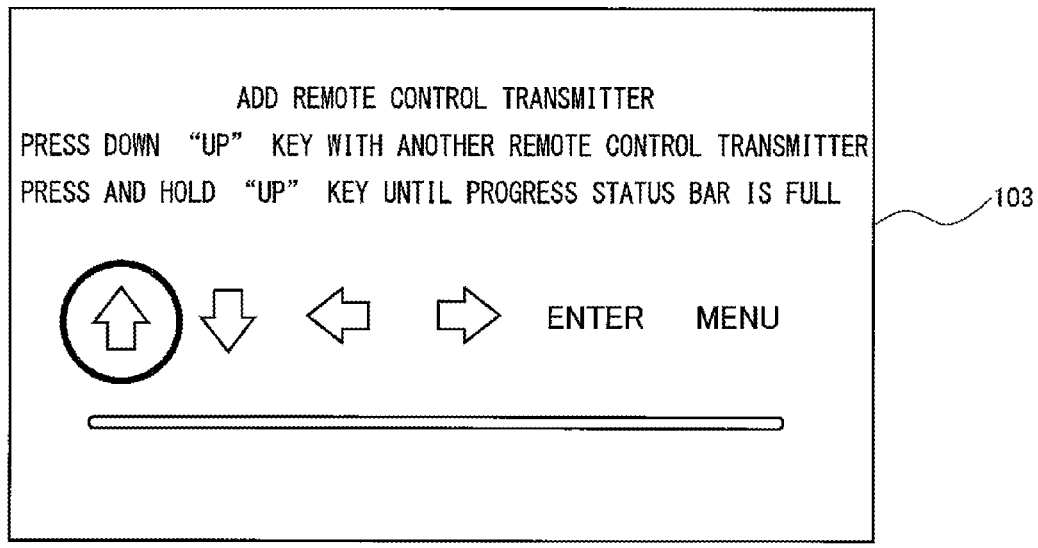
FIG. 7 A diagram showing an example of the display screen of the video display device.

When the Apple remote 37 is utilized to select the remote control transmitter additional function from the menu of the Apple TV 2, since the display screen 103 becomes a registration screen as shown in FIG. 7, the user sequentially presses down, according to an instruction on the registration screen, the "up" key, the "down" key, the "right" key, the "left" key, the "ENTER" key and the "menu (MENU)" key provided in the TV remote control transmitter 29. Thus, the remote control codes corresponding to the "up" key, the "down" key, the "right" key, the "left" key, the "ENTER" key and the "menu (MENU)" key provided in the TV remote control transmitter 29 are stored in the internal memory of the main CPU 31. Hence, after the registration operation described above, the "up" key, the "down" key, the "right" key, the "left" key, the "ENTER" key and the "menu (MENU)" key provided in the TV remote control transmitter 29 are operated, and thus it is possible to remotely operate not only the video display device 1 but also the Apple TV 2.

When the Apple TV 2 is specified such that the remote control codes corresponding to the "up" key, the "down" key, the "right" key, the "left" key, the "ENTER" key and the "menu (MENU)" key provided in the TV remote control transmitter 29 are previously stored in the internal memory of the main CPU 31, the registration operation described above can be omitted.

Signal lines used in HDMI transmission will now be described. The signal lines used in the HDMI transmission are first to fifth signal lines that will be described below.

The first signal line is a TMDS data signal line along which sound and video data and information frame (information on a format and the like for the sound and video data) are transmitted in one way from a source device (in the present embodiment, the Apple TV 2) to a sync device (in the present embodiment, the video display device 1) in the TMDS form.

The second signal line is a HPD (hot plug detect) signal line which is mainly used to provide an instruction of sound and video data feeding start timing, from the source device to the sync device.

The third signal line is a DDC (display data channel) signal line which is used to transmit specific information (such as a vendor name, a model number, an acceptable resolution and a HDMI terminal number) on the sync device to the source device. The DDC signal line is also used for HDCP (high-bandwidth digital content protection) certification.

The fourth signal line is a DDC 5 V signal line for supplying a 5 V power supply voltage from the source device to the sync device. The hardware of the sync device is configured such that after the 5 V power supply voltage from the source device is supplied along the fourth signal line, the sync device outputs a 5 V HPD signal to a HPD pin of the HDMI terminal.

The fifth signal line is a CEC signal line which is used for realizing a CEC (consumer electronics control) function.

The CEC function is a function that allows bidirectional control between the source device and the sync device, and is specified, together with a standard for output of the sound and video data, by a HDMI standard. A large number of electronic devices corresponding to the CEC function have already been sold. Since in the CEC function, it is possible to bidirectionally exchange a command between the source device and the sync device, both one-to-one device control and one-to-many device control are possible. Although the CEC standard specifies various functions, it is depends on a maker which function is realized in a product.

Operations of the video display device 1 and the Apple TV 2 related to the present invention will now be described.

When the system controller 25 receives, from the remote control light receiver 24, the remote control code corresponding to common keys (in the present embodiment, the "up" key, the "down" key, the "right" key, the "left" key, the "ENTER" key and the "menu (MENU)" key) that are also recognized by both the video display device 1 and the Apple TV 2, if the "input target" is the "HDMI3", the system controller 25 feeds, to the Apple TV 2, a valid signal for making the remote operation valid with the CEC command and does not perform the operation of the video display device 1 corresponding to the remote control code received from the remote control light receiver 24 whereas if the "input target" is one other than the "HDMI3", the system controller 25 feeds, to the Apple TV 2, an invalid signal for making the remote operation invalid with the CEC command and performs the operation of the video display device 1 corresponding to the remote control code received from the remote control light receiver 24.

On the other hand, when the sub-CPU 32 receives, from the remote control light receiver 35, the remote control code corresponding to the common key that is recognized by both the video display device 1 and the Apple TV 2, the sub-CPU 32 is placed on standby for transmission of the CEC command for a valid signal or an invalid signal from the video display device 1. When the CEC command for the valid signal is fed, the sub-CPU 32 controls the operation of the main CPU 31 such that the operation of the Apple TV 2 corresponding to the remote control code received from the remote control light receiver 35 is performed. When the CEC command for the invalid signal is fed, the sub-CPU 32 controls the operation of the main CPU 31 such that the operation of the Apple TV 2 corresponding to the remote control code received from the remote control light receiver 35 is not performed.

Here, a setting may be made such that the video display device 1 fails to generate any one of the valid signal and the invalid signal. In this case, when no CEC command has been fed from the video display device 1 for a period of time during which a predetermined period has elapsed since the reception of the remote control code corresponding to the common key from the remote control light receiver 35, the sub-CPU 32 preferably regards that the one of the valid signal and the invalid signal which is not generated by the video display device 1 is fed.

Since in the present embodiment, the video display device 1 can switch the validness and the invalidness of the remote operation on the common key of the Apple TV 2, the following problem does not occur in which when the user operates the common key of the TV remote control transmitter 29, both the Apple TV 2 and the video display device 1 are operated at the same time, and thus not only the operation that is intended by the user but also the operation that is not intended by the user is performed.

Even when the "input target" is the "HDMI3", if a specific key other than the common keys is pressed down, the same processing as in the case where the "input target" is one other than the "HDMI3" may be performed by the video display device 1. Thus, when the "input target" is the "HDMI3", for example, it is easy to call up not the menu of the Apple TV 2 but the menu of the video display device 1, with the result that the usability is enhanced.

Second Embodiment

Points different from those in the first embodiment discussed above will be described, and the description of the same points as in the first embodiment will be omitted.

In a second embodiment, the Apple TV 2 is an example of an external device according to another aspect of the present invention.

In the present embodiment, the video display device 1 uses the CEC command to notify the Apple TV 2 whether or not the "input target" of the video display device 1 is the "HDMI3".

When the sub-CPU 32 receives, from the remote control light receiver 24, the remote control code corresponding to the common key (in the present embodiment, the "up" key, the "down" key, the "right" key, the "left" key, the "ENTER" key and the "menu (MENU)" key) that is also recognized by both the video display device 1 and the Apple TV 2, if a notification that the "input target" of the video display device 1 is the "HDMI3" is received, the sub-CPU 32 feeds the invalid signal for making the remote operation invalid to the video display device 1 with the CEC command, and controls the operation of the main CPU 31 such that the operation of the Apple TV 2 corresponding to the remote control code received from the remote control light receiver 35 is performed whereas if a notification that the "input target" of the video display device 1 is one other than the "HDMI3" is received, the sub-CPU 32 feeds the valid signal for making the remote operation valid to the video display device 1 with the CEC command, and controls the operation of the main CPU 31 such that the operation of the Apple TV 2 corresponding to the remote control code received from the remote control light receiver 35 is not performed.

On the other hand, when the system controller 25 receives, from the remote control light receiver 35, the remote control code corresponding to the common key that is recognized by both the video display device 1 and the Apple TV 2, the system controller 25 is placed on standby for transmission of the CEC command for the valid signal or the invalid signal from the Apple TV 2. When the CEC command for the valid signal is fed, the system controller 25 performs the operation of the video display device 1 corresponding to the remote control code received from the remote control light receiver 24. When the CEC command for the invalid signal is fed, the system controller 25 does not perform the operation of the video display device 1 corresponding to the remote control code received from the remote control light receiver 24.

Here, a setting may be made such that the Apple TV 2 fails to generate any one of the valid signal and the invalid signal. In this case, when no CEC command has been fed from the Apple TV 2 for a period of time during which a predetermined period has elapsed since the reception of the remote control code corresponding to the common key from the remote control light receiver 24, it is preferably regarded that the one of the valid signal and the invalid signal which is not generated by the Apple TV 2 is fed.

Since in the present embodiment, the Apple TV 2 can switch the validness and the invalidness of the remote operation on the common key of the video display device 1, the following problem does not occur in which when the user operates the common key of the TV remote control transmitter 29, both the Apple TV 2 and the video display device 1 are operated at the same time, and thus not only the operation that is intended by the user but also the operation that is not intended by the user is performed.

Even when the "input target" is the "HDMI3", if a specific key other than the common keys is pressed down, the video display device 1 may notify the Apple TV 2 that the "input target" is one other than the "HDMI3". Thus, when the "input target" is the "HDMI3", for example, it is easy to call up not the menu of the Apple TV 2 but the menu of the video display device 1, with the result that the usability is enhanced.

<Others>

Although in the embodiments described above, the specific external device that can be remotely operated by the remote control transmitter for remotely operating the video display device is the Apple TV, a device other than the Apple TV (for example, a set top box) may be used.

Although in the embodiments described above, the specific external device that can be remotely operated by the remote control transmitter for remotely operating the video display device is inserted into the insertion portion of the video display device, and thus the specific external device is connected to the video display device, the specific external device may be connected to the video display device through a cable or the like.

Although in the embodiments described above, the video stream is transmitted to the video display device through the HDMI from the specific external device that can be remotely operated by the remote control transmitter for remotely operating the video display device, the video stream may be transmitted to the video display device through an interface other than the HDMI from the specific external device. Although in the embodiments described above, one of the video display device and the specific external device controls the other with the CEC command, the control may be performed in a form other than the CEC command.

| List of Reference Symbols | |
|---|---|
| 1 | video display device |
| 2 | Apple TV |
| 11 | tuner/descrambler |
| 12 | DEMUX circuit |
| 13 | AV decoder |

-continued

List of Reference Symbols

| | |
|---|---|
| 14 | signal processing circuit |
| 15 | input switching circuit |
| 16 | video processing circuit |
| 17 | scaler |
| 18 | composite circuit |
| 19 | video output circuit |
| 20 | display |
| 21 | sound processing circuit |
| 22 | sound output circuit |
| 23 | speaker |
| 24 | remote control light receiver |
| 25 | system controller |
| 26 | memory |
| 27 | OSD display circuit |
| 28 | Internet processing circuit |
| 29 | remote control transmitter (TV remote control transmitter) |
| 29A | operation key group |
| 29B | CPU |
| 29C | transmission portion |
| 30 | Internet |
| 31 | main CPU |
| 32 | sub-CPU |
| 33 | wireless communication portion |
| 34 | Ethernet communication portion |
| 35 | remote control light receiver |
| 36 | video sound processing circuit |
| 37 | remote control transmitter (Apple remote) |
| 101 | operation portion |
| 102 | terminal portion |
| 103 | display screen |
| 104 | light reception surface |
| 105 | power supply lamp |
| 106 | insertion portion |
| 107 | HDMI terminal |
| 108 | AC power supply terminal |
| 201 | HDMI port |
| 202 | AC power supply port |
| 203 | Ethernet port |
| 204 | optical digital sound port |

The invention claimed is:

1. A video display device comprising:
an input terminal through which a video stream output by a specific external device is input;
a reception portion; and
a control portion,
wherein the video display device has, choices of an "input target", a plurality of choices including a choice corresponding to the input terminal,
the reception portion receives a remote control signal transmitted from a remote control transmitter for remotely operating the video display device, and transmits, to the control portion, a signal including a remote control code based on the remote control signal and
when the control portion receives, from the reception portion, any one of the remote control codes corresponding to at least one of predetermined keys provided in the remote control transmitter,
if the "input target" is set at the choice corresponding to the input terminal, the control portion controls the specific external device such that a remote operation of the specific external device on the at least one of predetermined keys is made valid, and does not perform an operation of the video display device corresponding to the remote control code received from the reception portion whereas
if the "input target" is not set at the choice corresponding to the input terminal, the control portion controls the specific external device such that the remote operation of the specific external device on the at least one of predetermined keys is made invalid, and performs the operation of the video display device corresponding to the remote control code received from the reception portion.

2. The video display device of claim 1,
wherein the remote control codes corresponding to the at least one of predetermined keys are remote control codes that are recognized by both the video display device and the specific external device.

3. The video display device of claim 1,
wherein even when the "input target" is set at the choice corresponding to the input terminal, if a specific key provided in the remote control transmitter other than the at least one of predetermined keys is operated, same processing as when the "input target" is not set at the choice corresponding to the input terminal is performed.

4. An external device that outputs a video stream to a video display device, the external device comprising:
a reception portion; and
a control portion,
wherein the reception portion receives a remote control signal transmitted from a remote control transmitter for remotely operating the video display device, and transmits, to the control portion, a signal including a remote control code based on the remote control signal and
when the control portion receives, from the reception portion, any one of the remote control codes corresponding to at least one of predetermined keys provided in the remote control transmitter,
if a notification that the "input target" of the video display device is set at a choice which inputs the video stream from the external device is received from the video display device, the control portion controls the video display device such that a remote operation of the video display device on the at least one of predetermined keys is made invalid, and performs an operation of the external device corresponding to the remote control code received from the reception portion whereas
if a notification that the "input target" of the video display device is not set at the choice which inputs the video stream from the external device is received from the video display device, the control portion controls the video display device such that the remote operation of the video display device on the at least one of predetermined keys is made valid, and does not perform the operation of the external device corresponding to the remote control code received from the reception portion.

5. The external device of claim 4,
wherein the remote control codes corresponding to the at least one of predetermined keys are remote control codes that are recognized by both the video display device and the external device.

* * * * *